United States Patent
Andrews et al.

(10) Patent No.: US 8,910,247 B2
(45) Date of Patent: Dec. 9, 2014

(54) CROSS-SITE SCRIPTING PREVENTION IN DYNAMIC CONTENT

(75) Inventors: Michael Andrews, Redmond, WA (US); Sharat Shroff, Bellevue, WA (US); Dennis Gursky, Bellevue, WA (US); Melissa Lauren Benua, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 12/899,255

(22) Filed: Oct. 6, 2010

(65) Prior Publication Data

US 2012/0090026 A1 Apr. 12, 2012

(51) Int. Cl.
*H04L 29/06* (2006.01)
*G06F 21/62* (2013.01)
*G06F 17/30* (2006.01)
*G06F 21/52* (2013.01)

(52) U.S. Cl.
CPC .......... *G06F 17/3089* (2013.01); *H04L 63/102* (2013.01); *H04L 63/10* (2013.01); *G06F 21/6263* (2013.01); *G06F 21/6218* (2013.01); *H04L 63/08* (2013.01); *G06F 21/52* (2013.01)
USPC ............... 726/4; 713/176; 713/161; 713/165; 713/180

(58) Field of Classification Search
CPC . G06F 21/6263; G06F 17/3089; G06F 21/52; G06F 21/6218; H04L 9/3247; H04L 9/3236; H04L 2209/60; H04L 63/08; H04L 63/102; H04L 63/10; H04W 12/06
USPC .......................................................... 726/4
See application file for complete search history.

(56) References Cited

U.S. PATENT DOCUMENTS

| | | | |
|---|---|---|---|
| 6,880,083 B1 * | 4/2005 | Korn ............................. | 713/170 |
| 7,343,626 B1 | 3/2008 | Gallagher | |
| 7,565,544 B1 * | 7/2009 | Eatough et al. ............... | 713/176 |
| 7,606,915 B1 | 10/2009 | Calinov | |
| 2002/0087660 A1 | 7/2002 | Martin et al. | |

(Continued)

OTHER PUBLICATIONS

Philipp Vogt et al. "Cross Site Scripting Prevention with Dynamic Data Tainting and Static Analysis." Proceeding of the Network and Distributed System Security Symposium (NDSS), San Diego, CA, Feb. 2007.*

(Continued)

*Primary Examiner* — Thanhnga B Truong
*Assistant Examiner* — Narciso Victoria
(74) *Attorney, Agent, or Firm* — Dave Ream; Sade Fashokun; Micky Minhas

(57) ABSTRACT

Embodiment relate to systems, methods, and computer storage media for suppressing cross-site scripting in a content delivery system. A request is received for content that includes a scripted item or scripted items. The scripted item is identified within the content. An identifier is associated with the scripted element when the scripted element is an intended scripted element to be associated with the content. The identifier may be a hash value based from a hash function and the scripted item. Prior to communicating the content to a user, the scripted item is identified again to determine if an identifier is associated with the scripted item. If an identifier is associated with the scripted item, the identifier is evaluated to determine if the identifier is appropriate. When the identifier is determined to not be appropriate, the scripted item is prevented from being communicated to a user.

18 Claims, 5 Drawing Sheets

(56) References Cited

U.S. PATENT DOCUMENTS

| | | |
|---|---|---|
| 2004/0260754 A1 | 12/2004 | Olson |
| 2006/0143688 A1 | 6/2006 | Futoransky |
| 2008/0263650 A1 | 10/2008 | Kerschbaum |
| 2009/0119769 A1 | 5/2009 | Ross et al. |
| 2009/0165124 A1 | 6/2009 | Spektor |
| 2009/0292983 A1 | 11/2009 | Anand |
| 2011/0154473 A1* | 6/2011 | Anderson et al. ............... 726/11 |

OTHER PUBLICATIONS

Notification of Transmittal of the International Search Report and the Written Opinion of the International Searching Authority, or the Declaration, in PCT/US2011/050469 dated Mar. 28, 2011, 9 pages.

Vogt, et al., "Cross-Site Scripting Prevention with Dynamic Data Tainting and Static Analysis", 2007, 12 pages, http://citeseerx.ist.psu.edu/viewdoc/download?doi=10.1.1.129.2063&rep=rep1&type=pdf.

Meier, et al., "How to: Prevent Cross-Site Scripting in ASP.NET", May 2005, 10 pages, http://msdn.microsoft.com/en-us/library/ff649310.aspx.

Paul Lee, "Cross-Site Scripting: Use a Custom Tag Library to Encode Dynamic Content", Sep. 1, 2002, 11 pages, http://www.ibm.com/developerworks/tivoli/library/s-csscript/.

Nadji, et al., "Document Structure Integrity: A Robust Basis for Cross-site Scripting Defense", Retrieved Date: Jul. 20, 2010, 20 pages, http://citeseerx.ist.psu.edu/viewdoc/download?doi=10.1.1.153.3372&rep=rep1&type=pdf.

* cited by examiner

CROSS-SITE SCRIPTING PREVENTION IN DYNAMIC CONTENT

BACKGROUND

Traditionally, cross-site scripting is a security vulnerability found within Internet accessible content. A cross-site scripting vulnerability may be exploited by a third party to acquire personal data or to trick an end user into performing a malicious action. For example, a cross-site scripting vulnerability may be exploited to steal an end user's Internet cookies, which may allow for the third party to access the end user's account associated with the Internet cookie. Similarly, a cross-site scripting vulnerability may allow a third party to trick an end user into accessing or disseminating malware.

Previously, cross-site scripting has been prevented, in part, by sanitizing content that may contain encoded content that may be communicated to an end user. Unfortunately, the sanitizing process only provides relief for those vulnerabilities known to exist or known to potentially exist. If a third party identifies a new vulnerability and exploits that vulnerability before the Internet content is encoded, an end user may fall victim to a cross-site scripting attack.

SUMMARY

Embodiments of the present invention relate to systems, methods, and computer storage media for identifying a scripted item within content requested by a user. Identification of a scripted item may be performed to both apply a unique identifier to the scripted item and/or to determine if a unique identifier associated with the scripted item is appropriate. The identifier may be used to identify authorized scripting elements within the content and distinguish from unauthorized scripting elements. Embodiments of the present invention contemplate the identifier determined, at least in part, from a hash function of scripting elements element's content. When the identifier is determined to be appropriate, the scripted item may be communicated to the user. However, when the identifier is determined to not be appropriate, the scripted item may be prevented from being communicated to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
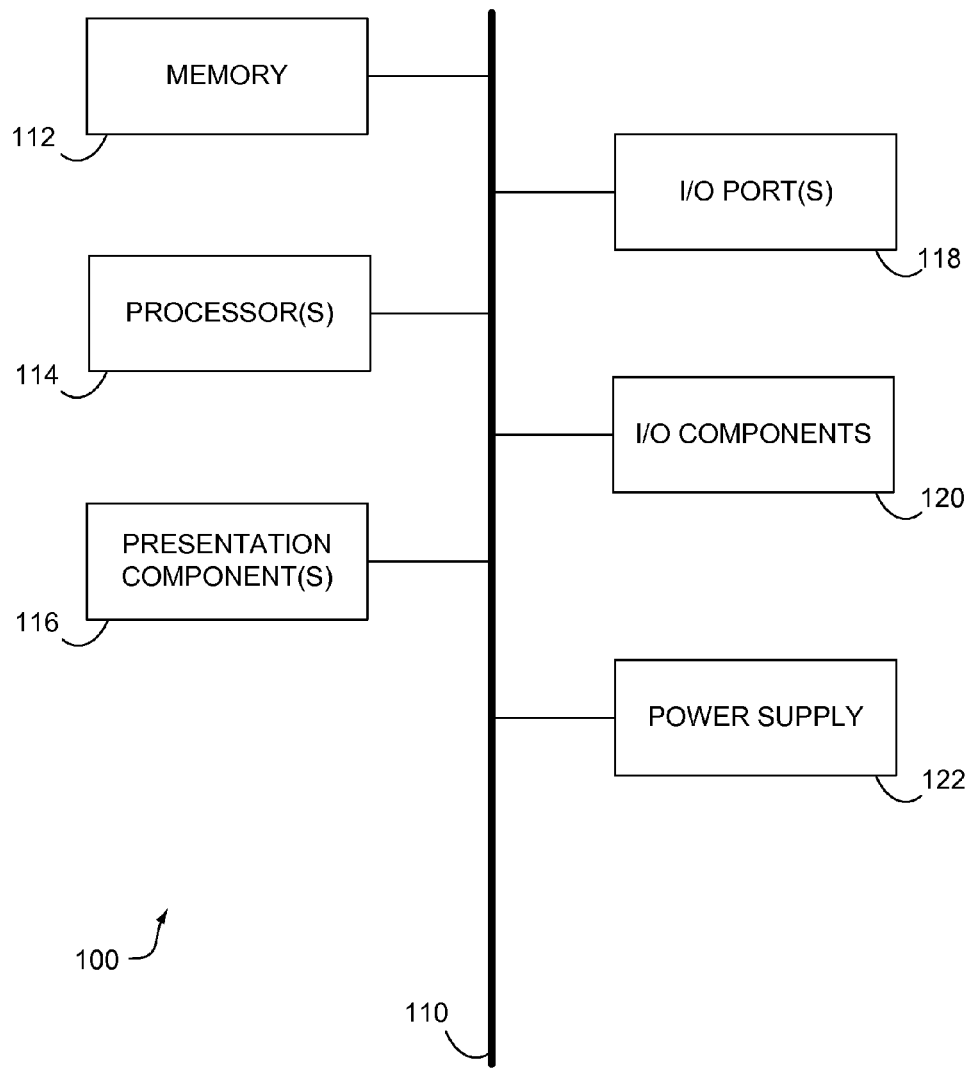
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for identifying a scripted item within content requested by a user. Identification of a scripted item may be performed to both apply a unique identifier to the scripted item and/or to determine if a unique identifier associated with the scripted item is appropriate. The identifier may be used to identify authorized scripting elements within the content and distinguish from unauthorized scripting elements. Embodiments of the present invention contemplate the identifier determined, at least in part, from a hash function of scripting elements element's content. When the identifier is determined to be appropriate, the scripted item may be communicated to the user. However, when the identifier is determined to not be appropriate, the scripted item may be prevented from being communicated to the user.

Accordingly, in one aspect, the present invention provides a method in a computing environment utilizing a processor and memory for suppressing cross-site scripting in a content delivery system. The method includes identifying a scripted item within content requested by a user. The method also includes determining the scripted item includes an identifier. The identifier is able to be used to identify authorized scripting elements within the content. The method also includes determining if the identifier is an appropriate identifier. When the identifier is determined to be appropriate, the scripted item is communicated to the user. Further, when the identifier is determined to not be appropriate, the scripted item is prevented from being communicated to the user.

In another aspect, the present invention provides computer storage media having computer-executable instructions embodied thereon, that when executed by a computing system having a processor and memory, cause the computing system to perform a method. The method includes receiving a request for content from a user. The method also includes determining a first hash value for a scripted item of the content. The first hash value is based on a hash function and the scripted item. The method also includes applying the first hash value to the scripted item. Further, the method includes determining a second hash value for the scripted item. The second hash value may be determined immediately prior to communicating the scripted item to the user. The second hash value is based on the hash function and the scripted item. The method also includes determining the scripted item is not proper based on the first hash value and the second hash value. For example, the first hash value and the second hash value may lack a specified relationship to one another.

A third aspect of the present invention provides a method. The method includes receiving, from a user, a markup language request for markup language content, the markup language content is provided by a server associated with a computing system. In response to receiving the markup language request, the method includes generating a unique identifier. Additionally, the method includes identifying, within the markup language content, a first scripted item. The method also includes associating the unique identifier to the first scripted item. Prior to communicating the content to the user, the method includes identifying one or more scripted items to be communicated to the user, wherein the one or more scripted items includes the first scripted item. Further, the method includes determining a second scripted item of the one or more scripted items is not associated with the unique identifier. Also, the method includes preventing communication of the second scripted item to the user. Additionally, the method includes removing the association between the first scripted item and the unique identifier prior to communicating the first identifier to the user. The method also includes communicating the first scripted item to the user.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, distributed computing environments, servers, client-side computers, and the like. Embodiments may also be practiced, as previously mentioned, in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other non-transitory medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
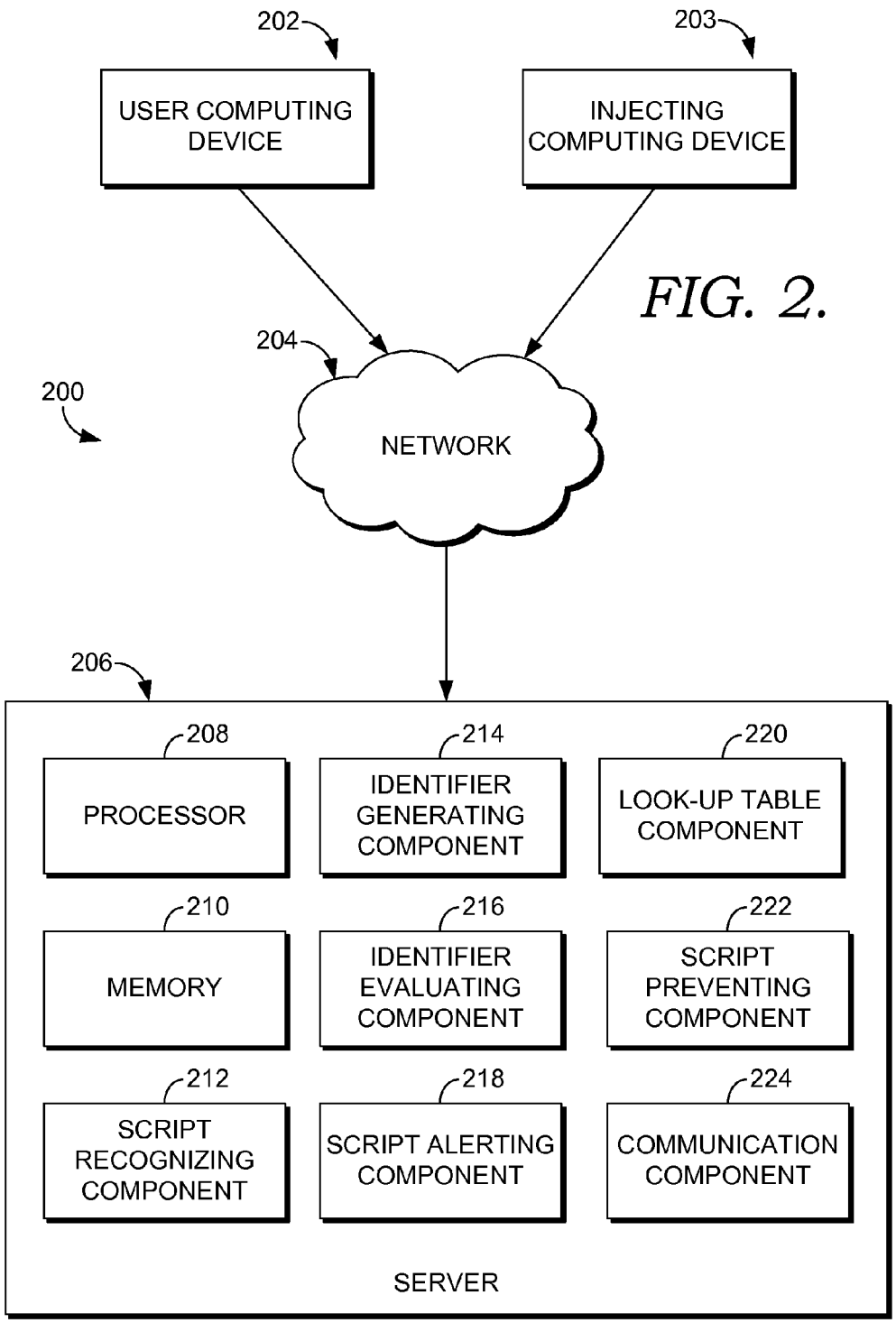
FIG. 2 depicts a block diagram illustrating an exemplary system in which embodiments of the present invention may be employed.

With reference to FIG. 2, a block diagram is provided illustrating an exemplary system 200 in which embodiments of the present invention may be employed. It should be understood that this and other arrangements described herein are set forth only as examples. Other arrangements and elements (e.g., machines, roles, services, processes, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a user computing device 202, an injecting computing device 203, and a server 206. Each of the components shown in FIG. 2 may be any type of computing device, such as computing device 100 described with reference to FIG. 1, for example. The components may communicate with each other via a network 204, which may include, without limitation, one or more local area networks (LANs) and/or wide area networks (WANs). Such networking environments are commonplace in offices, enterprise-wide computer networks, intranets, and the Internet. It should be understood that any number of user computing devices, injecting computing devices, server, and networks may be employed within the system 200 while still being within the scope of the present invention. Additionally, other component not shown may also be included within the system 200.

Accordingly, any number of components/devices may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting.

The user computing device 202 is a computing device useable by a user. For example, the user computing device 202 may be any type of personal computer, laptop computer, tablet, mobile device, or the like that is capable of accessing the network 204.

Similarly, the injecting computing device 203 is a computing device useable by a user or another machine. For example, the injecting computing device 203 may be any type of personal computer, laptop computer, tablet, mobile device, or the like that is capable of accessing the network 204.

The server 206, as will be discussed in more detail hereinafter, is a computing device capable of providing content to the user computing device 202 by way of the network 204. It should be understood, that while the server 206 is described herein generally as a tangible device having discrete properties and components, the server 206 may instead be a distributed computing system having a plurality of processors, memory devices, and other software, firmware, and components distributed across the network 204 (or similar networks). Consequently, the server 206 may include one or more servers (i.e., computing devices) to perform the functions described herein.

The user computing device 202, the injecting computing device 203, the network 204, and the server 206 may be used, in combination or alone, the cause a cross-site scripting attack to occur and for the same attack to be mitigated. A cross-site scripting attack is commonly characterized as either a non-persistent attack or, in the alternative, as a persistent attack.

Traditionally, a cross-site scripting attack takes advantage of vulnerabilities that allow attackers to bypass client-side security mechanisms normally imposed on web content by the computing device and/or software. Injection of malicious scripts into web pages allows an attacker can gain elevated access privileges to sensitive page content, session cookies, and other information maintained on behalf of a user.

A non-persistent (also referred to as a reflected) cross-site scripting vulnerability occurs when data provided by a web client, which may be as an HTTP query parameter or HTML form submission, is used immediately by server-side scripts to generate a page of results for that user without first sanitizing the response. Because HTML documents are typically serial structures that incorporate control statements, formatting, and the actual content into a common document, any non-validated user-supplied data included in the resulting page without proper HTML encoding may lead to a cross-site scripting injection. A classic example of a non-persistent cross-site scripting vulnerability includes a search engine site where a searcher searches for a string, the search string will typically be redisplayed verbatim on the result page to indicate the original search query. If search query was a cross-site scripting attack and the search engine response does not properly escape or reject HTML control characters, a cross-site scripting flaw may occur with the presentation of the search results. While a user will not typically expose themselves to a cross-site scripting error on purpose, a third party may provide a deceptive link or hidden frames within a page visited by the user causing the user's browser to navigate to URLs on the vulnerable site automatically.

A non-persistent cross-site scripting attack scenario may occur as follows. Alice utilizes the user computing device 202 to access a particular Internet site that is hosted by Bob on the server 206. Bob's website allows Alice to log in with a username and password. Bob's website then stores information such as financial account information for Alice. Mallory notices that Bob's website contains a reflected (non-persistent) cross-site scripting vulnerability. Mallory generates a uniform resource locator (URL) to exploit the vulnerability in Bob's website. Mallory utilizes the injecting computing device 203 to send Alice an email (or other communication) that includes the URL. The URL will point to Bob's website, but will contain Mallory's malicious code, which Bob's website will reflect. Alice will visit the URL provided by Mallory while logged into Bob's website. Unfortunately for Alice, the malicious script embedded in the URL executes in Alice's browser as if the script came directly from Bob's website (this is the cross-site scripting vulnerability). The script may then be used to send Alice's session cookie to Mallory. Mallory can then use the session cookie to steal Alice's sensitive information maintained at Bob's website (e.g., authentication credentials, billing information, and the like) without Alice's knowledge.

The second type of cross-site scripting vulnerability referred to as persistent (or stored) occurs when data provided by an attacker is saved by a server and then displayed on "normal" pages provided to other users in the regular course of browsing. A classic example of persistent vulnerability includes online message boards where users are allowed to post HTML formatted messages for other users to read. A vulnerability occurs when the HTML formatted post includes scripts able to be executed by the user's browser. While this can be avoided in some examples with proper HTML escaping to prevent the script from being executed (or recognized by the browser as a script rather than mere text), proper HTML escaping may not be implemented by all sites with a persistent cross-site scripting vulnerability.

A persistent attack may occur as discussed in the following example. Mallory, utilizing the injecting computing device 203 again, posts a message with malicious payload to a social network hosted by the server 206. Alice, again utilizing the user computing device 202, reads the message posted by Mallory and served by the server 206. Upon reading the message posted by Mallory, Alice's browser executes malicious scripting that appears to have been provided by the social networking site hosted by the server 206. The malicious scripting is a cross-site scripting attack that steals Alice's cookie for the social network. Consequently, Mallory can access and utilize Alice's session to impersonate Alice on the social networking site.

Additionally, it is contemplated that the system 200 is suited for use in preventing distribution of any foreign malicious content injected within content requested by a user. For example, techniques discussed herein that utilize one or more components of the system 200 may be utilized to prevent communication of injected content with a man-in-the-middle ("MintM") type attack. For example, a MintM attack may involve a third party (e.g., injecting computing device 203) intercepting communications between a first party (e.g., the user computing device 202) and a second party (e.g., the server 206). The third party may monitor and/or modify content communicated from the second party (or the first party) to the other intended party. As a result, the third party may exploit this vulnerability to insert one or more unauthorized objects (e.g., a scripted item). In an exemplary embodiment, it is contemplated that embodiments discussed herein may be utilized to prevent dissemination of unauthorized objects in general and from MintM attacks in particular. Other attack scenarios are contemplated as being stifled by techniques discussed herein.

Returning to FIG. 2, the server 206 is comprised of a processor 208, memory 210, a script recognizing component 212, an identifier generating component 214, an identifier evaluating component 216, a script alerting component 218, a look-up table component 220, a script preventing component 222, and a communication component 224. It is understood that additional components or fewer components may be implemented with the server 206 while still being within the scope of the present invention. Further, it is contemplated that one or more of the components of the server 206 are implemented by hardware, software, firmware, or a combination. Additionally, it is contemplated that one or more of the components of the server 206 may be implemented by independent resources from one or more other components of the server 206. Moreover, it is contemplated that one or more of the components of the server 206 utilize, at least in part, the processor 208 and/or the memory 210 to perform one or more functionalities discussed herein.

The script recognizing component 212 identifies a scripted item within content that is requested by a user. A scripted item is a computer-readable code that may cause a computing device to perform an action. Examples of a scripted item include, but are not limited to, an executable script, an event handler, an object tag, HTML code, and the like. Scripted items are both intentionally included within content and also maliciously included within content to be communicated to a user. In one aspect, the script recognizing component 212 identifies (e.g., recognizes) one or more particular types of scripted items within requested content. For example, the script recognizing component 212 may identify all event handlers, or all object tags, or even certain (or all) HTML code, or any combination within content requested by a user. Similarly, it is contemplated that the script recognizing component 212 is capable of identifying intentionally included scripted items or maliciously (e.g., inappropriately) included scripted items as well.

The script recognizing component 212 may identify a scripted item utilizing techniques for matching known character combinations that are either known to be used or expected to be used with scripted items. Additional aspects of the script recognizing component 212 may function based on known syntax or expected syntax associated with scripted items to be identified within content requested by a user. Further yet, it is contemplated that the script recognizing component 212 may operate as a virtual or actual browser-type engine that processes content that could be communicated to a user. Wherein, the processing within the script recognizing component 212 exposes one or more scripted items. Other methods of identifying scripted items are contemplated herein.

The identifier generating component 214 generates an identifier to be used with a scripted item and/or a request. An identifier may be a unique character or combination of characters that may identify or signal a particular scripted item, request, series of scripted items, or the like. For example, it is contemplated that an identifier is generated for a received request for content from a user. The identifier may then be associated with the incoming request to uniquely identify the request and any content to be provided in response to the request. Consequently, the previously generated identifier for uniquely identifying the incoming request may carry through to uniquely identify content, such as scripted items, intended to be communicated in response to the request. Additionally, it is contemplated that an identifier that is a hash value unique to the content or portion of the content (e.g., a scripted item) may be generated for the associated information (e.g., content as a whole or particular portions). Utilizing a hash value will be discussed in more detail with respect to FIG. 4 hereinafter. Further, it is contemplated that the identifier generating component 214 randomly generates an identifier.

The identifier evaluating component 216 evaluates an identifier associated with requested content, a scripted item, a request, or the like. For example, one or more identifiers, which may be associated with a scripted item, are evaluated to ascertain if the scripted item is appropriate. An appropriate scripted item, as will be discussed in more detail hereinafter, is a scripted item that is intended by a provider of the content to be supplied to a requesting user. This is opposed to inappropriate scripted content that is typically provided by a third party with malicious or undesired intentions. An inappropriate scripted item may be used to exploit a cross-site scripting vulnerability.

The identifier evaluating component 216 may evaluate an identifier associated with a scripted item as recognized by the script recognizing component 212. The evaluation performed by the identifier evaluating component 216 may include referencing a look-up table maintained by the look-up table component 220 (to be discussed hereinafter). Similarly, the identifier evaluating component 216 may perform a comparison between the identifier as recognized with a scripted item and another identifier as generated by the identifier generating component 214 to ensure consistency among the two compared identifiers. For example, if the identifier recognized with the scripted item is based on a function, such as a hash value, the confirmation hash value may be generated and then compared to the recognized hash value to determine that the scripted item has not been altered or otherwise manipulated. Further, it is contemplated that the identifier evaluating component 216 may merely evaluate if an identifier is even present with a portion of content. Further yet, it is contemplated that the identifier evaluating component 216 evaluates a recognized identifier as compared to a corresponding request.

The script alerting component 218 provides a notification to one or more entities when an inappropriate or otherwise undesired portion of content is identified. For example, if a scripted item is determined to be exploiting a cross-site scripting vulnerability, the script alerting component 218 may work in conjunction with the communication component 224 to notify an administrator of the server 206 or an administrator of the content associated with the vulnerability. Similarly, it is contemplated that the script alerting component 218 provides a notification to the requesting user that the requested content includes a scripted item that may be inappropriate. The notification may be provided utilizing the communication component 224 to send an electronic communication or to otherwise inject or insert a notification into the content or to be displayed by the user computing device 202. For example, it is contemplated that the notification may be a message readable by a browser on the user computing device 202 to allow the browser to adjust protections provided to the user based on the content to be received. This is but a few examples of notification that may be provided by the script alerting component 218.

The look-up table component 220 provides a look-up table that contains a table for identifying appropriate content portions. For example, it is contemplated that a table is maintained with a correlation between a hash value function and a hash value for one or more scripted items. Similarly, it is contemplated that a table is maintained that is comprised of one or more identifiers for scripted items. Further, the look-up table component 220 may include a listing of intended scripted items to which an identifier may be assigned. Further, the look-up table component 220 may include a table to lists one or more scripted items previously identified as being inappropriate by the identifier evaluating component 216 for use by one or more entities when trying to identify exploited vulnerabilities. Further, the look-up table component 220 may include a table with one or more hash functions that may be used to generate an identifier by the identifier generating component 214.

The script preventing component 222 adjusts content to be communicated to a user. For example, the script preventing component 222 may remove a scripted item from content when the scripted item has been identified as being inappropriate. In another aspect, the script preventing component 222 may alter one or more portions of the content to prevent a scripted item that is identified as being inappropriate from being executed. For example, coding elements associated with the scripted item may be manipulated so as to prevent the scripted element from being rendered or otherwise executed by the user computing device 202. Additionally, aspects contemplate the script preventing component 222 preventing the communication of one or more portions of requested content when an inappropriate item is identified to be associated with the content.

The communication component 224 receives and distributes communications related to content. For example, the communication component 224 may receive a request from a user for content that is accessible by way of the server 206. Additionally, the communication component 224 may communicate one or more portions of the requested content from the server 206 to a user utilizing the user computing device 202. The communication component 224 may work in combination with the script preventing component 222 to prevent the communication of one or more portions of the content. The communication component may also communicate a notification to a user, an administrator, a content provider, or the like indicating that an inappropriate scripted item has been identified or that a vulnerability may exist.

As previously discussed, while the various components of the server 206 have been described with specific embodiments, it is understood that the components of the server 206 may provide additional operations and tasks. Further, it is understood that the components of the server 206 may be discrete or individual software, firmware, and/or hardware. Similarly, it is understood that one or more of the components of the server 206 may be combined as hybrid services providing one or more functions as discussed herein. Further yet, it is contemplated that one or more of the components identified herein as being associated with the server 206 may also, or in the alternative, be located on or in association with the user computing device 202. For example, the script recognizing component 212 and the identifier evaluating component 216 may reside on, or be functional at, the user computing device 202.

Figure 3:
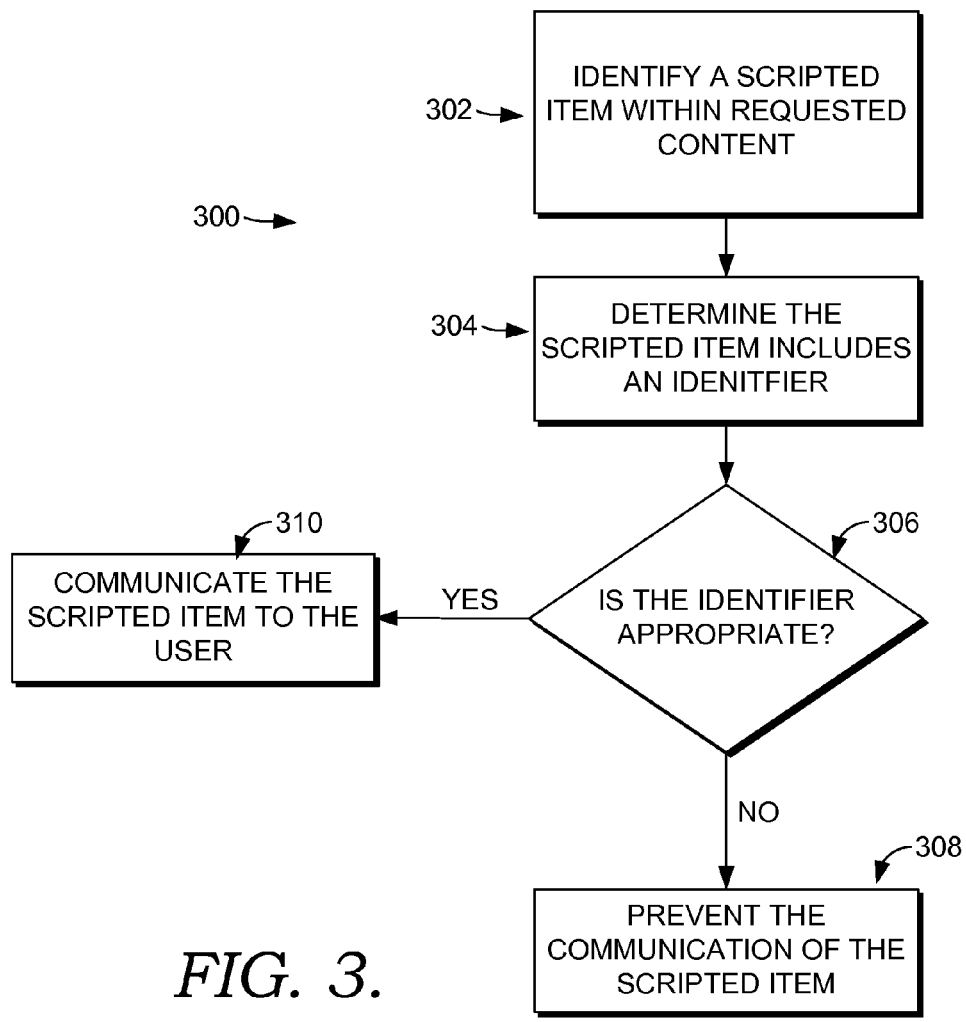
FIG. 3 depicts a flow diagram of an exemplary method for suppressing cross-site scripting in a content delivery system, in accordance with embodiments of the present invention.

FIG. 3 depicts a flow diagram of an exemplary method 300 for suppressing cross-site scripting in a content delivery system, in accordance with embodiments of the present invention. A content delivery system may include the computing system 200 discussed with respect to FIG. 2. A content delivery system is a system or environment in which content that has been requested by a client is provided to the requesting client. Typically, the Internet is an example of a content delivery system. But, other systems are contemplated herein. Suppressing of a cross-site scripting attack may include preventing the communication of a scripted item that has been identified as being inappropriate. Suppressing may also include altering content to prevent the execution or rendering of the identified scripted item.

The method 300 includes a block 302. The block 302 represents identifying a scripted item within requested content. Identifying a scripted item may utilize the script recognizing component 212 previously discussed with respect to FIG. 2. As previously discussed, a scripted item may be identified by searching for and identifying one or more characters or elements associated with a scripted item. Similarly, a scripted item may be identified by rendering at least a portion of the scripted item to locate scripted items as will be executed locally at a client, such as the user computing device 202 of FIG. 2.

Further, it is contemplated that as content requested by a user is being collected and scripted items are being added to the collection, that the scripted items are then identified.

In an aspect of the present invention, the identification of a scripted item within requested content is accomplished by the script recognizing component 212 of FIG. 2 identifying an identifier associated with a scripted item. For example, the script recognizing component 212 of FIG. 2 may know of an identifier or know of a syntax associated with an identifier to aid in the identification of a scripted item.

At a block 304, a determination that the scripted item identified at the block 302 includes an identifier is performed. For example, once a scripted item is identified, an evaluation of the scripted item may be performed so as to determine if the scripted item includes, either directly or indirectly, an identifier. An identifier may be directly associated with a scripted item when the identifier is included in-line with coding elements of the scripted item. Similarly, an identifier may be directly associated with the scripted item when the identifier is applied to an HTML tag of the scripted item. An identifier may be indirectly associated with a scripted item when the identifier is located within a look-up table that draws a correlation or association between the identifier and the scripted item.

At a block 306, a determination is performed if the identifier of the scripted item is appropriate. As previously discussed, a scripted item is not appropriate when the scripted item is exploiting vulnerability in an Internet accessible page or collection of pages. A scripted item is not appropriate when the scripted item is not intended by the administrator of content to be disseminated. Conversely, a scripted item may be appropriate when the scripted item is intended by an administrator of the content to be distributed to a requesting user.

It is contemplated herein that a scripted item that is appropriate at one time may later become inappropriate. For example, if a third-party alters a scripted item that is intended to be communicated by an administrator, the altered version of the scripted item may be inappropriate after being altered. A hash value may be used to help identify when an appropriate scripted item has been compromised and therefore should be identified as an inappropriate scripted item.

A determination of appropriateness of a scripted item may be performed by the identifier evaluating component 216 of FIG. 2. For example, an identifier associated with a scripted item may be evaluated to determine if it is present at all, and if it is present, if the identifier is an anticipated identifier. An anticipated identifier is an identifier that is expected or otherwise proper to be associated with a scripted item. An identifier may be appropriate if the identifier correlates as either a direct match or a derivation of an identifier associated with the underlying request. An identifier may also be appropriate if the identifier may be verified through a correlation table maintained by the look-up table component 220. Further, an identifier may be appropriate when the identifier may be independently determined (e.g., calculated) and the independent calculation is commensurate with the identified identifier (e.g., a hash value recalculation that corresponds to an associated hash value identifier). An identifier may be deemed inappropriate when the identifier is not commensurate with another identifier (e.g., a previously determined identifier, a previously associated identifier, an identifier of a related request, and the like).

At a block 308, when the identifier is determined to not be appropriate (i.e., inappropriate), the scripted item is prevented from being communicated to the user. Examples of preventing communication of a scripted item include, but are not limited to, stripping (e.g., removing) the scripted item from the content prior to communicating the content to a user. The prevention of communication of a scripted item may also include altering the scripted item so that the scripted item, in an unaltered state, is not communicated, but instead communicated in an altered state. As previously discussed, altering of the scripted item may include changing one or more coding elements to convert the scripted item into a non-executable portion of code. Preventing the communication of a scripted item may also include preventing the communication of all or some of the requested content to reduce or prevent damage caused by the scripted item.

In the alternative, when the identifier is determined to be appropriate at the block 306, the scripted item is communicated to a user, as depicted at a block 310. For example, content that is not vulnerable to cross-site scripting should, in general, be communicated to a requesting user without intervention. Consequently, content that is intended by an administrator to be communicated should be communicated when the identified identifier is an appropriate identifier.

As used herein, an appropriate identifier is an authorized identifier. Therefore, an authorized identifier signifies, in an exemplary embodiment, an authorized or intended scripting item to be communicated to a user. Conversely, if an identifier is inappropriate, the identifier may be unauthorized and therefore the scripted item may be inappropriate and should not be communicated to a user, in one aspect of the present invention.

Figure 4:
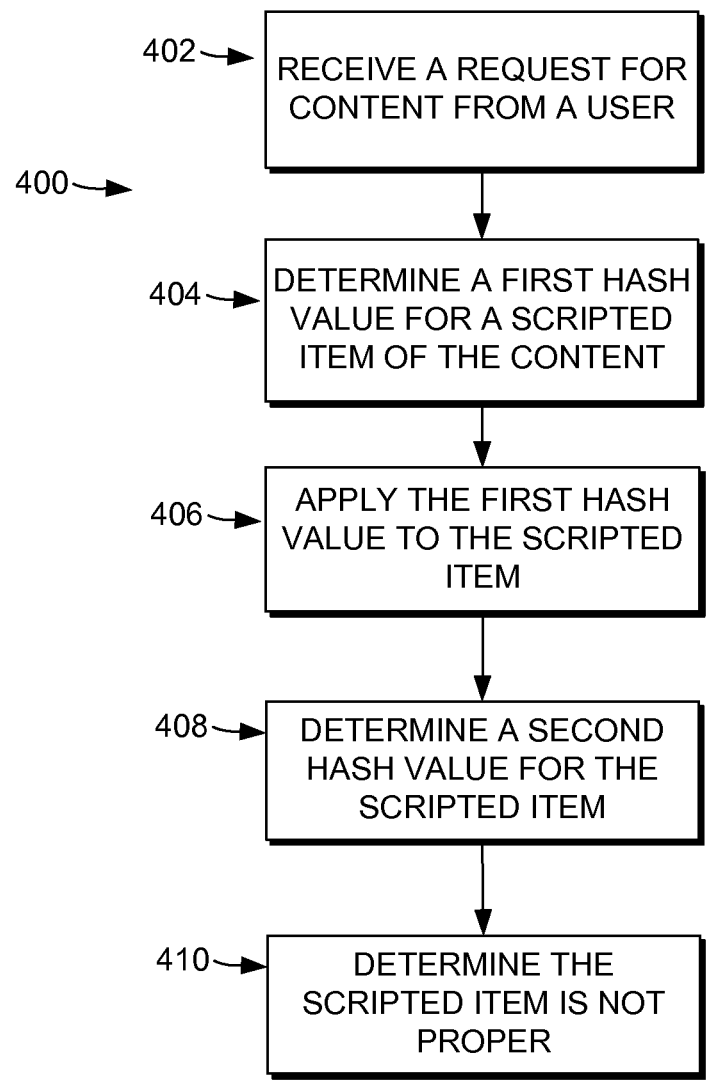
FIG. 4 depicts a flow diagram of a method for utilizing a hash function to determine a scripted item is improper in a content delivery system, in accordance with embodiments of the present invention.

FIG. 4 depicts a flow diagram of a method 400 for utilizing a hash function to determine a scripted item is improper in a content delivery system, in accordance with embodiments of the present invention. At a block 402, a request for content from a user is received. In an exemplary embodiment, the request is received at a server, such as the server 206 discussed with respect to FIG. 2. The request, in an exemplary embodiment, is a request for a response in the form of a markup language, such as hypertext markup language (HTML). However, it is contemplated that the request may be for a response in the form of any web service response. In an exemplary embodiment, upon receiving the request, an identifier is generated for the incoming request. For example, a unique identifier may be generated that is either attached to or associated with the incoming request so that that identifier may be later used to identify an inappropriate scripted item.

At a block 404, a first hash value for a scripted item of the content is determined. A hash value is a character or group of characters that result from a hash function being applied to an underlying object. In an exemplary embodiment of the present invention, a hash function is applied to a whole or a portion of a scripted item to result in an identifier. Consequently, if the scripted item or the portion of the scripted item is altered, the hash value resulting from the same hash function may also change. A hash value used in this scenario may be useful for both identifying intended scripted items as well as unaltered scripted items. Therefore, in this example, the determination of a first hash value for a scripted item may include applying at least a portion of the scripted item (e.g., characters, elements, coding fragments, variables, commands, etc) to a hash function that is unknown to a third party that may desire to inject a cross-site scripting attack.

A resulting hash value may serve as an identifier as discussed herein. Consequently, scripted items that are intended, by an administrator, to be communicated to a user are initially associated with a hash value calculated from the underlying scripted item and a hash function. As previously discussed, the hash function is an operation (e.g., mathematical) that converts an input (e.g., the scripted item characters) and potentially a hash-function parameter to an output of seemingly unrelated value (e.g., an identifier). It is contemplated herein that the hash function or its parameters are maintained secret from third parties to bolster the effectiveness of utilizing a hash function.

At a block 406, the first hash value is applied to the scripted item. Applying of the first hash value to the scripted item may include directly or indirectly associating the hash value as an identifier as previously discussed. In an exemplary embodiment, the first hash value is inserted within the scripted item. For example, a marker may be appended to the scripted item to provide the identifier. (e.g., "<script id=1234> . . . </script>", "<script hash=9876> . . . </script>"). Consequently, it is contemplated that applying an identifier or a hash value to a scripted item includes tagging the scripted item with the identifier and/or HTML tagging with a JavaScript. The applying of the first hash value (or an identifier) may include applying a variable to the scripted item. The variable may be then be referenced from a table to maintain control over access to the identifier or the function used to generate the identifier. Similarly, applying the identifier to a scripted item may include applying the identifier as static characters that are accessible directly from the script.

At a block 408, a second hash value is determined from the scripted item. For example, a common hash function may be used to determine both the first hash value and the second hash value. Therefore, in an exemplary embodiment, if the hash function does not change and the scripted item has not changed in the interim, the resulting first hash value and the resulting second hash value should be equivalent in an exemplary embodiment. Consequently, use of the second hash value may be effective for verify that a scripted item has not been altered from a state that it was in at the time of determining a first hash value.

At a block 410, a determination is made that the scripted item is not proper. In an exemplary embodiment, the determination that the scripted item is not proper is a result of a first or a second hash value not being identified with the scripted item. It is contemplated that the first or the second hash value may not be identified if the scripted item was injected by a third party. In another exemplary embodiment, the determination that the scripted item is not proper results when the second hash value, which was determined at the block 408, is not an equivalent to the first hash value determined at the block 404.

Figure 5:
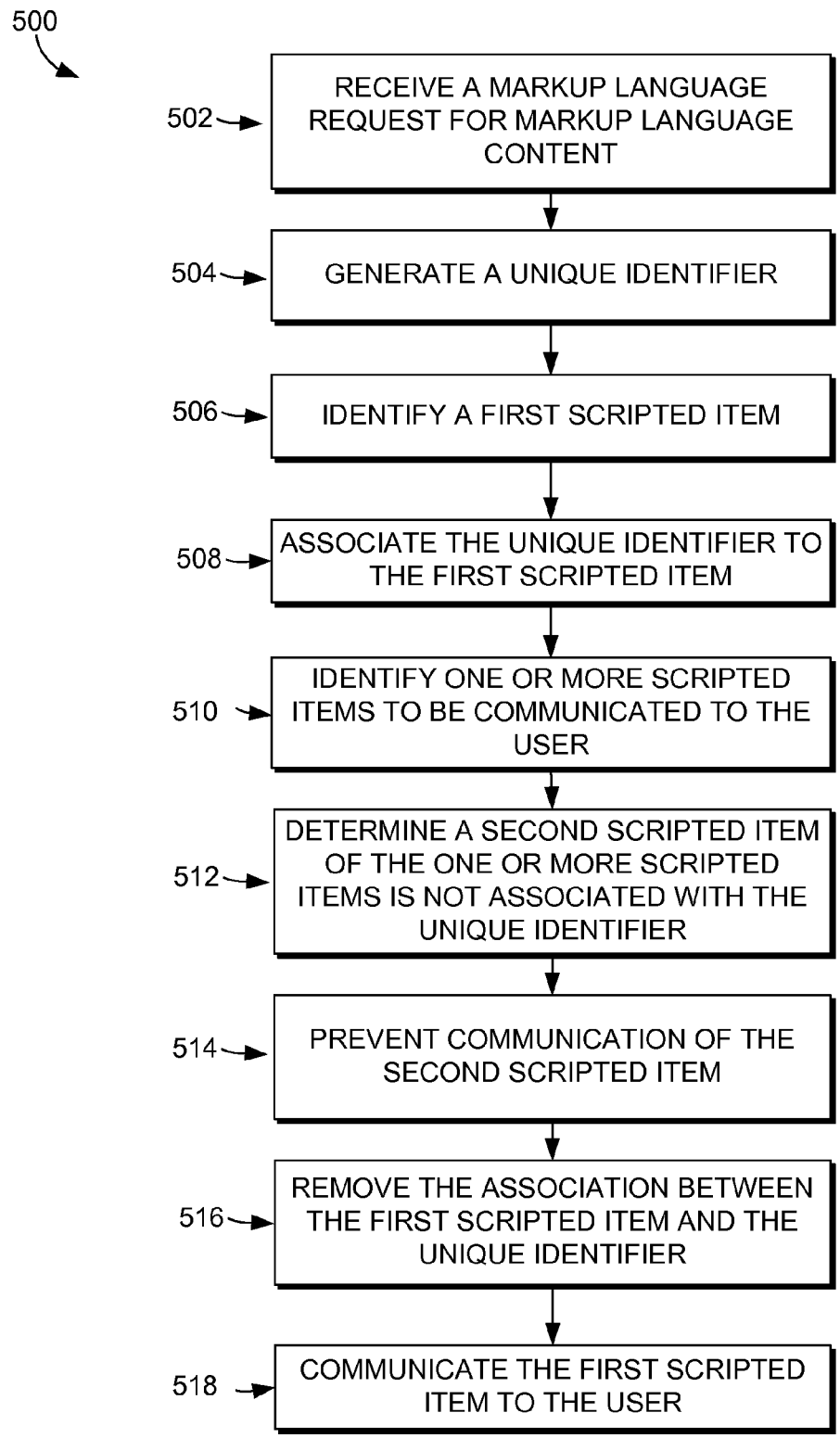
FIG. 5 depicts a flow diagram of method for preventing a cross-site scripting attack, in accordance with embodiments of the present invention.

FIG. 5 depicts a flow diagram of method 500 for preventing a cross-site scripting attack, in accordance with embodiments of the present invention. At a block 502, a markup language request for content is received at a server. In an exemplary embodiment, the request is generated by a user utilizing the user computing device 202 of FIG. 2. Further, in an exemplary embodiment, the request is communicated through the network 204 to be received by the server 206.

At a block 504, a unique identifier is generated in response to receiving the request. The identifier may be a string of character that is randomly generated, generated from a hash function, or otherwise generated so as to serve as an identifier for one or more scripted items.

At a block 506, a first scripted item is identified within the requested content. The requested content may be in the form of a markup language, such as HTML. Further, the scripted item may be identified by the script recognizing component 212 of FIG. 2.

At a block 508, the unique identifier is associated with the first scripted item. As previously discussed, the association of the unique identifier may be accomplished by tagging the scripted item and/or updating a look-up table to maintain a correlation between the unique identifier and the first scripted item.

At a block 510, one or more scripted items that may be communicated to the user as part of the content are identified prior to being communicated to the user. In an exemplary embodiment, the one or more scripted items include the first scripted item and a second scripted item. In an exemplary embodiment, the first scripted item is different from the second scripted item.

At a block 512, the second scripted item is determined to not be associated with the unique identifier. For example, if the second scripted item is not a scripted item provided by the author(s) of the requested content, then a unique identifier may not associated with the second scripted item. The second scripted item may therefore be an injected scripted item.

At a block 514, the second scripted item is prevented from being communicated to the user. In an exemplary embodiment, the second scripted item is determined to be an inappropriate scripted item based on the lack of association with a unique identifier (which may be the same or different from the unique identifier associated with the first scripted item). As previously discussed, prevention of communication of the second scripted item may include removing the second scripted item, altering the second scripted item, or other methods to prevent the second scripted item from executing on the requesting user's computing device.

At a block 516, the association between the first scripted item and the unique identifier is removed prior to communicating the first scripted item to the user. In an exemplary embodiment, it is desired to maintain a transparent process from the user so as to not provide clues or hints to the syntax used with an identifier. Maintaining this level of secrecy or private knowledge hinders a malicious third party from imitating the unique identifier to avoid the cross-site scripting detection provided by the unique identifier. Therefore, it is contemplated that the removing of the association between the first scripted item and the unique identifier may include removing the unique identifier from the scripted item (e.g., removed from the markup language), removing a reference to the unique identifier that is used by a look-up table, changing the unique identifier to provide a decoy identifier, or otherwise obscuring the unique identifier).

In an exemplary embodiment, all or at least a portion of the unique identifier and/or a hash function are maintained private from the user. Maintaining privacy means that the actual identifier or hash function is not exposed nor are hints or clues exposed as to the underlying identifier or hash function. Consequently, in an aspect of the present invention, the unique identifier generation, association, determination, and the like is a transparent process to the user.

At a block 518, the first script is communicated to the user. In an exemplary embodiment, the first script is determined to have a unique identifier and that unique identifier is determined to be equivalent to the unique identifier generated at the block 504. Further, in an exemplary embodiment, the first scripted item is communicated without the unique identifier incorporated therein. Additionally, in an exemplary embodiment, additional portions of the content requested by the user may also be communicated to the end user so long as those other portions are also determined to be appropriate by a similar technique.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub combinations are of utility and may be employed without reference to other features and sub combinations and are contemplated within the scope of the claims. Not all steps listed in the various figures need be carried out in the specific order described.

The invention claimed is:

1. A method in a computing environment utilizing a processor and memory for suppressing cross-site scripting in a content delivery system, the method comprising:
   identifying, at a server, a scripted item within content requested by a user, at a user computing device;
   determining, at the server, the scripted item includes an identifier, wherein the identifier is able to be used to identify authorized scripting elements within the content;
   determining, at the server, the identifier is not an appropriate identifier; and
   in response to determining that the identifier is not an appropriate identifier, preventing communication of the scripted item to the user, wherein preventing communication of the scripted item to the user comprises at least one of:
   (1) altering the scripted item to prevent execution of the scripted item by a computing device associated with the user, or
   (2) removing the scripted item from the content.

2. The method of claim 1, wherein the scripted item is one from the following:
   an executable script,
   an event handler,
   an object tag, or
   HTML code.

3. The method of claim 1, wherein the identifier is associated with a request from the user for the content.

4. The method of claim 1, wherein the identifier is a randomly-generated identifier.

5. The method of claim 1, wherein the identifier is a hash value determined based, at least in part, on the scripted item.

6. The method of claim 1, wherein the authorized scripting elements are scripting elements intended by an author of the content to be included with the content.

7. The method of claim 1, wherein an appropriate identifier is an identifier previously associated with the request.

8. The method of claim 1 further comprising communicating a notification of an inappropriate scripted item when the identifier is determined to be not appropriate.

9. One or more computer-readable media devices having computer-executable instructions embodied thereon, that when executed by a computing system having a processor and memory, cause the computing system to perform a method for identifying a scripted item within content requested by a user, the method comprising:

receiving, at a server, a request for content from a user, at a user computing device;

determining, at the server, a first hash value for a scripted item of the content, wherein the first hash value is based on a hash function and the scripted item;

applying, at the server, the first hash value to the scripted item;

determining, at the server, a second hash value for the scripted item, wherein the second hash value is based on the hash function and the scripted item;

determining, at the server, the scripted item is not proper based on the first hash value and the second hash value; and in response to determining that the scripted item is not proper, preventing communication of the scripted item to the user, wherein preventing communication of the scripted item to the user comprises at least one of:

(1) altering the scripted item to prevent execution of the scripted item by a computing device associated with the user, or (2) removing the scripted item from the content.

10. The media of claim 9, wherein the request is for a response in the form of a markup language.

11. The media of claim 9, wherein the first hash value is a value unique to the scripted item.

12. The media of claim 9, wherein elements of the hash function are unknown to the user.

13. The media of claim 9, wherein applying the first hash value to the scripted item includes applying the first hash value in-line with the scripted item or applying an HTML tag to the scripted item.

14. The media of claim 9, wherein applying the first hash value includes applying the first hash value to the scripted item as a variable.

15. The media of claim 9, wherein applying the first hash value includes updating a look-up table with the first hash value in association with the scripted item.

16. The media of claim 9, wherein the scripted item is not proper when the first hash value and the second hash value are not equivalents.

17. The media of claim 9, wherein preventing communication of the scripted item to the user comprises removing the scripted item from the content prior to communicating the content to the user.

18. One or more computer-readable media devices having computer-executable instructions embodied thereon, that when executed by a computing system having a processor and memory, cause the computing system to perform a method for identifying a scripted item within content requested by a user, the method comprising:

receiving, at a server, a request for markup language content from a user, at a user computing device, wherein the markup language content is provided by the server associated with the computing system;

in response to receiving the markup language content request at the server, generating a unique identifier;

identifying, at the server, within the markup language content, a first scripted item;

associating, at the server, the unique identifier to the first scripted item;

prior to communicating the markup language content to the user, identifying at the server, one or more scripted items to be communicated to the user, wherein the one or more scripted items includes the first scripted item;

determining, at the server, a second scripted item of the one or more scripted items is not associated with the unique identifier;

preventing, at the server, communication of the second scripted item to the user, wherein preventing communication of the second scripted item to the user comprises at least one of:

(1) altering the second scripted item to prevent execution of the second scripted item by the user computing device, or (2) removing the second scripted item from the markup language content;

removing, at the server, the association between the first scripted item and the unique identifier prior to communicating the first identifier to the user; and communicating the first scripted item to the user.

* * * * *